United States Patent
Kokott

(10) Patent No.: US 9,249,848 B2
(45) Date of Patent: Feb. 2, 2016

(54) MOTOR VEHICLE BRAKE DISC

(71) Applicant: BAYERISCHE MOTOREN WERKE AKTIENGESELLSCHAFT, Munich (DE)

(72) Inventor: Kordian Kokott, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/256,274

(22) Filed: Apr. 18, 2014

(65) Prior Publication Data

US 2014/0224603 A1 Aug. 14, 2014

Related U.S. Application Data

(63) Continuation of application No. PCT/EP2012/068130, filed on Sep. 14, 2012.

(30) Foreign Application Priority Data

Oct. 21, 2011 (DE) .......................... 10 2011 084 946

(51) Int. Cl.
*F16D 65/12* (2006.01)
*F16D 65/02* (2006.01)

(52) U.S. Cl.
CPC ............ *F16D 65/123* (2013.01); *F16D 65/128* (2013.01); *F16D 2065/136* (2013.01); *F16D 2065/1316* (2013.01); *F16D 2200/003* (2013.01); *F16D 2200/0013* (2013.01)

(58) Field of Classification Search
CPC .......... F16D 2065/1316; F16D 65/123; F16D 2200/003
See application file for complete search history.

(56) References Cited

U.S. PATENT DOCUMENTS 3,542,166 A * 11/1970 Harrison ................. 188/218 XL
4,108,286 A * 8/1978 Gagarin .................. 188/218 XL
4,913,266 A * 4/1990 Russell et al. ............. 188/18 A
6,247,562 B1 6/2001 Gotti et al.
(Continued)

FOREIGN PATENT DOCUMENTS

CN 101815883 A 8/2010
DE 1 775 685 9/1971
(Continued)

OTHER PUBLICATIONS

German Search Report dated Jul. 25, 2012 with partial English translation (ten (10) pages).
(Continued)

*Primary Examiner* — Bradley King
(74) *Attorney, Agent, or Firm* — Crowell & Moring LLP

(57) ABSTRACT

A brake disk for a disk brake includes a brake disk chamber and a friction ring fastened thereto. By way of particularly six to twelve centering and/or fastening extensions directed inward from an inner diameter of the friction ring, the friction ring is placed in the axial direction on the face side on centering attachments of the brake disk chamber, and is fixed on the brake disk chamber by way of fastening devices, particularly screws and/or rivets that extend in the axial direction. The centering attachments of the brake disk chamber are recesses in the brake disk chamber edge or in the brake disk chamber edge and in the brake disk chamber jacket, one centering and/or fastening extension of the friction ring respectively projecting into them.

9 Claims, 3 Drawing Sheets

(56) References Cited

U.S. PATENT DOCUMENTS

| | | |
|---|---|---|
| 6,978,866 B2 | 12/2005 | Niebling et al. |
| 7,472,777 B2 * | 1/2009 | Schlitz et al. ............ 188/218 XL |
| 7,654,365 B2 | 2/2010 | Lamb |
| 2004/0134720 A1 * | 7/2004 | Niebling et al. ............ 188/18 A |
| 2006/0272905 A1 | 12/2006 | Schlitz et al. |
| 2007/0193837 A1 | 8/2007 | Lamb |
| 2008/0135359 A1 | 6/2008 | Basirico et al. |
| 2008/0271965 A1 | 11/2008 | Reulein et al. |
| 2009/0218183 A1 * | 9/2009 | Burgoon et al. ......... 188/218 XL |
| 2010/0307875 A1 * | 12/2010 | Ilg et al. ................... 188/218 XL |
| 2011/0259684 A1 | 10/2011 | Kokott et al. |
| 2012/0037467 A1 * | 2/2012 | Kokott et al. ............ 188/218 XL |
| 2012/0073917 A1 * | 3/2012 | Lee ........................... 188/218 XL |
| 2013/0032440 A1 * | 2/2013 | Karl et al. ................. 188/218 XL |
| 2014/0124308 A1 * | 5/2014 | Kim et al. ................. 188/218 XL |

FOREIGN PATENT DOCUMENTS

| | | |
|---|---|---|
| DE | 10 2007 011 743 A1 | 9/2008 |
| DE | 10 2009 010 973 A1 | 9/2010 |
| DE | 10 2009 017 234 A1 | 10/2010 |
| EP | 0 987 462 A1 | 3/2000 |
| WO | WO 2005/095816 A1 | 10/2005 |

OTHER PUBLICATIONS

International Search Report dated Feb. 5, 2013 with English translation (six (6) pages).

Chinese Office Action issued in counterpart Chinese Application No. 201280051554.3 dated Aug. 21, 2015 with English-language translation (twelve (12) pages).

\* cited by examiner

MOTOR VEHICLE BRAKE DISC

CROSS REFERENCE TO RELATED APPLICATIONS

This application is a continuation of PCT International Application No. PCT/EP2012/068130, filed Sep. 14, 2012, which claims priority under 35 U.S.C. §119 from German Patent Application No. 10 2011 084 946.7, filed Oct. 21, 2011, the entire disclosures of which are herein expressly incorporated by reference.

BACKGROUND AND SUMMARY OF THE INVENTION

The invention relates to a brake disc for a motor vehicle having at least a brake disc chamber and a friction ring fastened thereto. The friction ring, by way of particularly six to twelve radially inward directed centering and/or fastening extensions, placed in the axial direction on the face side on centering attachments of the brake disc chamber, and is fixed on the brake disc chamber by way of fastening devices, particularly screws and/or rivets, extending in the axial direction.

Composite brake discs are known which have friction rings made of gray cast iron, connected with a brake disc chamber made of light metal. German Patent document DE 10 2009 017 234 A1 describes a brake disc constructed in such a fashion, where the friction ring and the chamber are joined by separate elements, such as pins, screws, etc. In this case, the brake disc chamber has a base,—the chamber disc—, a surrounding wall,—the chamber jacket—, and an edge—the chamber edge—and is made of an aluminum alloy. The friction ring is fastened to the chamber edge by way of fastening devices, such as screws and/or rivets, extending in the axial direction; specifically by way of centering and/or fastening extensions of the friction ring, which point inward from an inner diameter of the friction ring and are placed in the axial direction on the face side onto centering attachments of the chamber edge and are connected with the fastening devices.

Light metal and gray cast iron expand differently when heated. In addition, the brake disc chamber and the friction ring are heated differently during braking. As a result, depending on the heat input into the friction ring during the braking, tensions occur in the brake disc by way of the connection between the brake disc chamber and the friction ring.

It is an object of the present invention to provide a brake disc, mainly for a motor vehicle, which has a connection between the brake disc chamber and the friction ring, by which connection as few tensions as possible will build up in the brake disc during the braking.

According to the invention, this and other objects are achieved by a brake disc for a disc brake, which comprises of at least a brake disc chamber and a friction ring fastened thereto which, by way of particularly six to twelve centering and/or fastening extensions directed inward from its inner diameter, placed in the axial direction on the face side on centering attachments of the brake disc chamber, is fixed on the brake disc chamber by way of fastening devices, particularly screws and/or rivets, extending in the axial direction. The centering attachments of the brake disc chamber are recesses in the brake disc chamber edge or in the brake disc chamber edge and in the brake disc chamber jacket, one centering and/or fastening extension of the friction ring respectively projecting into them.

If the brake disc and the brake disc chamber are mutually separable parts, the manufacturing of each part will be simple and cost-effective. Furthermore, the brake discs can be exchanged without the necessity of demounting the entire wheel assembly, and weight is also saved. It is advantageous for the brake disc chamber to center the brake disc in the radial and axial direction. When the friction ring is guided by way of its centering and/or fastening extensions in grooves of the brake disc chamber and is not connected directly with the latter by way of fastening devices, this has the advantage that, when heated, the friction ring and the brake disc chamber can expand relative to one another to a certain extent, without the occurrence of significant material tensions because of a different expansion.

In an advantageous embodiment of the invention, the brake disc is characterized in that, by way of the fastening devices, a fastening ring is mounted at the brake disc chamber edge. The fastening ring covers the recesses in the brake disc chamber edge and thereby fixes the centering and/or fastening extensions of the friction ring at least in the axial direction at the brake disc chamber.

As a result, the brake disc chamber and the friction ring are advantageously fixed to one another such that heat expansion movements, as a result of different materials, can still take place without causing excessive material tensions because of the fastening by way of balancing features of the fastening device. For this purpose, it is also advantageous for the centering and/or fastening extensions of the friction ring to form a clearance fit in the circumferential direction with the recesses in the brake disc chamber. This also facilitates the joining of the brake disc chamber and the friction during the mounting of the brake disc. When the recesses in the brake disc chamber in the axial direction are then less deep, particularly by 0.1 to 0.8 mm, than the depth of the centering and/or fastening extensions in the axial direction, the fastening ring will become wavy during the connection with the brake disc chamber as a result of the depth difference of its supporting surfaces. On the one hand, this causes the connection of the brake disc chamber and the friction ring to be free of play in the axial direction and, on the other hand, causes it to be flexible because of the elasticities of the material.

An embodiment of the invention is particularly simple for the mounting of the brake disc, in which the brake disc centering device and/or the brake disc fastening device is constructed on the brake disc chamber jacket profiles, situated on the exterior side in the axial direction, on one side, and the chamber disc is constructed on the other side; i.e. viewed from the friction ring, the brake disc chamber extends essentially in one direction. In this case, the brake disc chamber jacket may extend as a cylinder jacket parallel to the center axis of the brake disc chamber parallel to the center axis of the brake disc chamber or may be constructed in a beveled fashion as a conical jacket.

When then the one-piece internally cooled friction ring of the brake disc consists of two friction discs with cooling-air ducts, which connect the latter and are situated in-between, and when the centering and/or fastening extensions are situated on only one friction disc, particularly on that friction disc which faces the brake disc chamber, this has the advantage that the cooling of the friction ring is less affected by the brake disc chamber.

Furthermore, the brake disc chamber jacket can be reinforced at least by a chamber disc extending in the radial direction, which is situated at the end of the brake disc chamber jacket further away from the friction ring. In this case, the brake disc chamber jacket and/or the chamber disc will then consist of a light metal alloy and can both advantageously be cast together in one operation. In comparison to the gray cast iron material, the weight can thereby be reduced enormously.

DETAILED DESCRIPTION OF THE DRAWINGS

Figure 1:
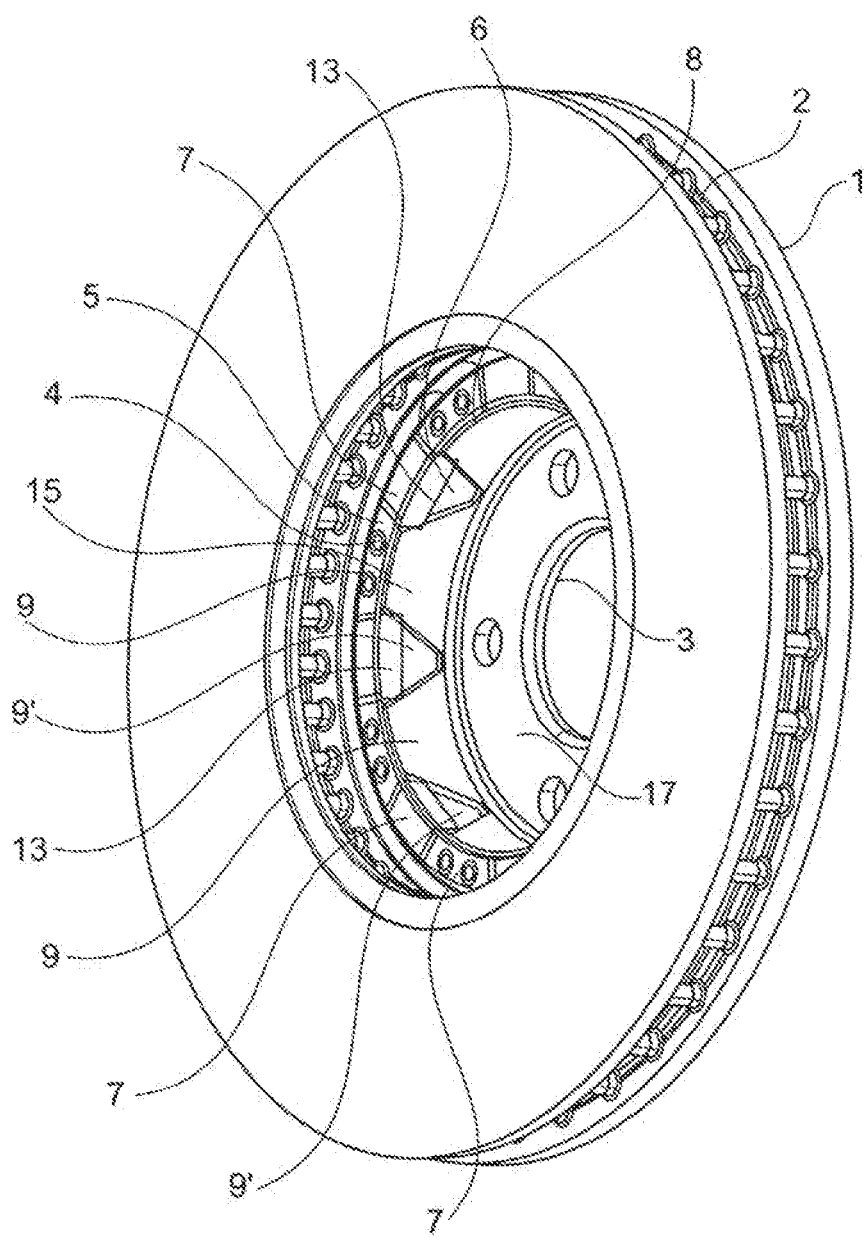
FIG. 1 is a perspective view of a brake disc according to an embodiment of the invention.
Figure 2:
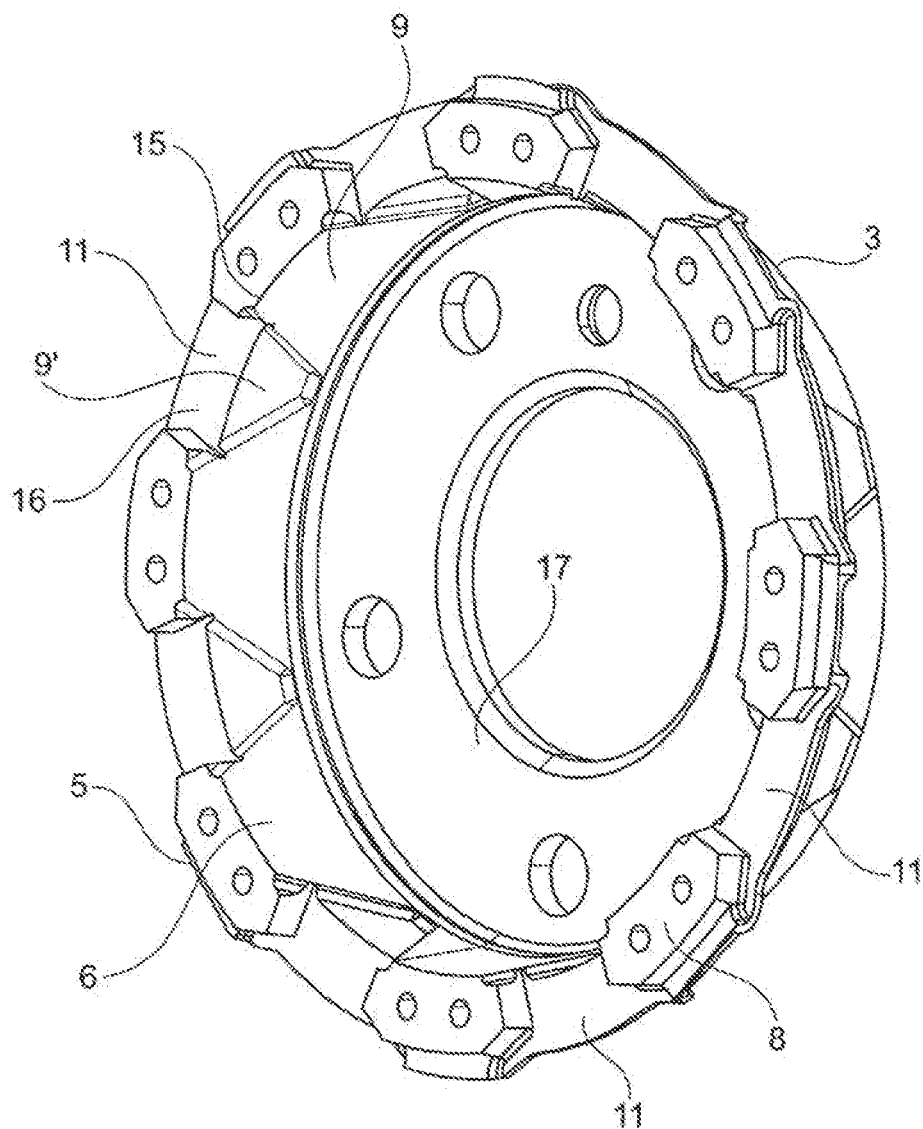
FIG. 2 is a perspective view of the brake disc chamber according to FIG. 1 without having the friction ring mounted thereon.
Figure 3:
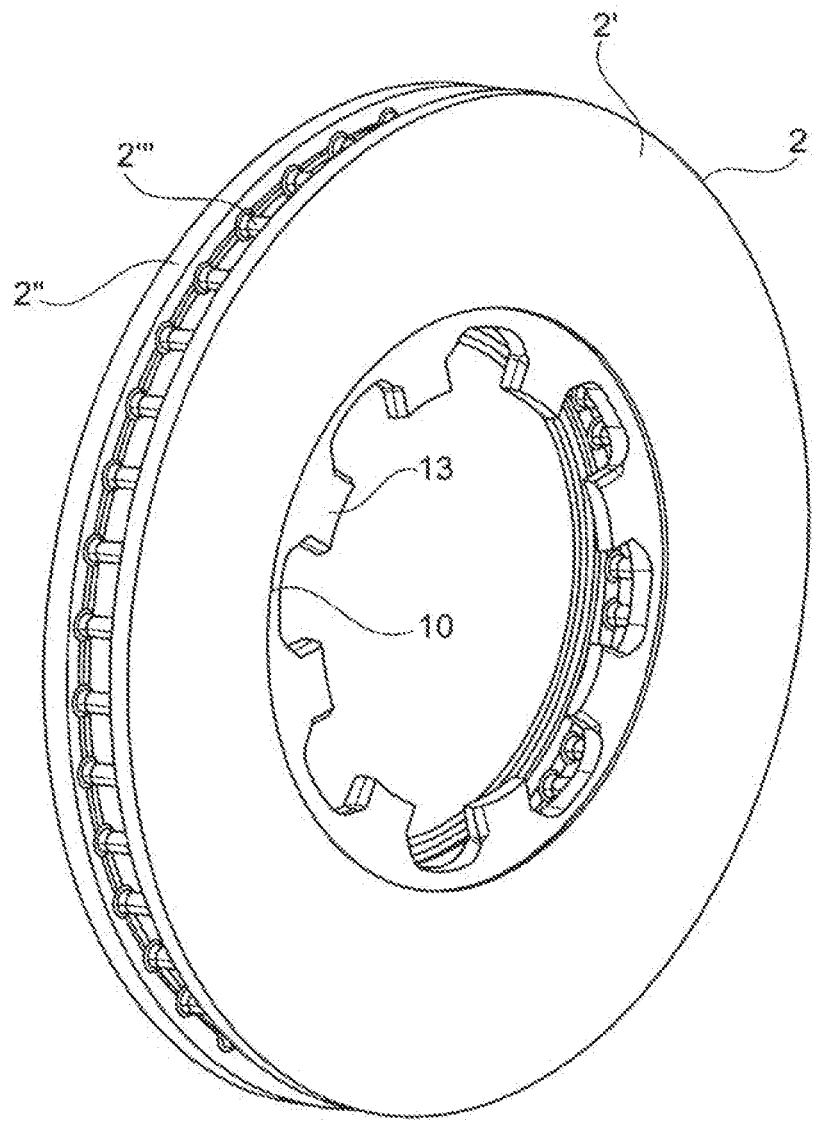
FIG. 3 is a perspective view of the friction ring according to FIG. 1 without having the brake disc chamber mounted thereon.

The entire brake disc 1, the brake disc chamber 3 and the friction ring 2, respectively illustrated in different scales in FIGS. 1 to 3, are assigned to a wheel hub, (not shown). The wheel hub extends about an axis extending through its center as is conventionally known to one of skill in the art. In the figures, the same reference numbers mark identical parts.

FIG. 3 shows that the one-piece, internally cooled friction ring 2 made of gray cast iron consists of two friction discs 2', 2''. Cooling-air ducts 2''' connect the friction ring discs and are arranged in-between the friction ring discs. Centering and/or fastening extensions 13 of the friction ring 2 are situated on only one friction disc 2', specifically on that friction disc which, after the mounting, faces the brake disc chamber 3 made of a light-metal alloy. Viewed from the friction ring 2, the brake disc chamber extends essentially in one direction (FIG. 3).

The brake disc 1 for a disc brake includes a brake disc chamber 3 and a friction ring 2 fastened thereto. The friction ring 2 has eight centering and/or fastening extensions 13 directed inward from its inner diameter 10. The friction ring 2 is placed in the axial direction on a face side of the brake disc chamber 3 on centering attachments 11. The centering attachments of the brake disc chamber 3 are constructed as recesses 11 in the brake disc chamber edge 5 and in the brake disc chamber jacket 6, one centering and/or fastening extension 13 of the friction ring 2 respectively projecting into them. Resting on the eight centering and fastening extensions 13 of the friction ring 2, which project over the recesses 11 by 0.5 mm in the axial direction at the friction-ring-side-end of the brake disc chamber 3, a fastening ring 7 is fixed by way of rivets 4 extending in the axial direction at the circular-ring elements 8 of the brake disc chamber edge 5 situated between the centering and fastening extensions 13. The fastening ring 7 extends over the entire brake disc chamber edge 5 and covers its recesses 11 by way of the centering and fastening extensions 13 of the friction ring 2 and the circular-ring elements 8 of the brake disc chamber edge 5 situated in-between. As a result, the brake disc chamber 3 and the friction ring 2 are fixed to one another at least in the axial direction, in which case, a type of floating bearing is created in the radial direction, which floating bearing permits different radial expansion movements because of a heating of the brake disc 1 without building up excessive tensions between the brake disc chamber 3 and the friction ring 2. This is also caused by the fact that the centering and fastening extensions 13 of the friction ring 2 form a clearance fit in the circumferential direction with the recesses 11 in the brake disc chamber 3.

As a result of the fact that the recesses 11 in the brake disc chamber 3 in the axial direction are 0.5 mm less deep than the depth of the centering and/or fastening extensions 13 in the axial direction, the fastening ring 7 will become wavy during it riveting with the brake disc chamber edge 5, which makes the fastening connection free of play and slightly flexible in the axial direction.

FIG. 2 shows that the brake disc chamber 3 is shaped such that no undercuts whatsoever are present and the latter can therefore easily be produced by two corresponding mold halves by casting of light metal. The brake disc chamber jacket 6 is reinforced by a chamber disc 17 extending in the radial direction, at the end of the brake disc chamber jacket 6 farther away from the friction ring 2.

The essentially cylindrical brake disc chamber jacket 6 consists of segments 9, 9' in the shape of bent symmetrical trapezoids which follow one another in the circumferential direction, are alternately rotated by 180 angular degrees, and are arranged in a regular fashion at an alternately different radial distance from the longitudinal center axis of the brake disc chamber jacket 6. In this case, the short sides 15 of the symmetrical trapezoids 9 at the brake disc chamber edge 5 are in each case located at the fastening devices for the fastening ring 7—the rivets 4—and these symmetrical trapezoids 9 have the shorter distance from the longitudinal center axis of the brake disc chamber jacket 6. In contrast, the long sides 16 of the symmetrical trapezoids 9' at the brake disc chamber edge 5 are in each case located at the recesses 11 in the brake disc chamber edge 5, and these symmetrical trapezoids 9' have the greater distance from the longitudinal center axis of the brake disc chamber jacket 6.

The trapezoidal segments 9, 9' of the brake disc chamber jacket 6 represent stiffening areas which increase the design stability while, at the same time, reducing the weight by saving material.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake disc for a disc brake, the brake disc comprising:
a friction ring having six to twelve centering and fastening extensions extending from an inner diameter thereof radially inward;
a brake disc chamber comprising a brake disc chamber jacket having a brake disc chamber edge at a face side thereof, wherein the brake disc chamber further comprises centering attachments formed as recesses in the chamber edge or in the chamber edge and the chamber jacket, the centering and fastening extensions of the friction ring respectively projecting into the recesses of the brake disc chamber when the friction ring is placed in an axial direction on the face side of the brake disc chamber; and
a fastening ring mounted at the brake disc chamber edge so as to cover the recesses of the brake disc chamber in which the centering and fastening extensions of the friction ring project, wherein
the fastening ring fixes the centering and fastening extensions of the friction ring against axial float at the brake disc chamber in the axial direction, and
the recesses in the brake disc chamber have a depth in the axial direction that is less than the depth of the centering and fastening extensions, whereby the fastening ring obtains a wavy form after mounting.

2. The brake disc according to claim 1, wherein the centering and fastening extensions of the friction ring and the recesses of the brake disc chamber are configured to provide a clearance fit in a circumferential direction.

3. The brake disc according to claim 1, wherein the recesses in the brake disc chamber are 0.1 to 0.8 millimeters less deep than the depth of the centering and fastening extensions.

4. The brake disc according to claim 1, wherein the brake disc chamber extends essentially in one direction from a side of the friction ring.

5. The brake disc according to claim 1, wherein the friction ring comprises two friction discs having cooling-air ducts arranged between the two friction discs and connecting the two friction discs, and
   wherein the centering and fastening extensions are arranged on only one of the two friction discs.

6. The brake disc according to claim 5, wherein the centering and fastening extensions are arranged on the one friction disc that faces the brake disc chamber when the friction ring is mounted on the brake disc chamber.

7. The brake disc according to claim 1, wherein the brake disc chamber further comprises a chamber disc configured to reinforce the brake disc chamber jacket, the chamber disc being arranged at an end of the brake disc chamber jacket facing away from the friction ring and extending in a radial direction.

8. The brake disc according to claim 1, wherein the brake disc chamber is composed of a light alloy.

9. The brake disc according to claim 8, wherein the friction ring is composed of gray cast iron.

* * * * *